US011809522B2

(12) United States Patent
Kounev et al.

(10) Patent No.: US 11,809,522 B2
(45) Date of Patent: Nov. 7, 2023

(54) AI-BASED, SEMI-SUPERVISED INTERACTIVE MAP ENRICHMENT FOR RADIO ACCESS NETWORK PLANNING

(71) Applicant: AT&T Intellectual Property I, L.P., Atlanta, GA (US)

(72) Inventors: Velin Kounev, Weehawken, NJ (US); Yaron Kanza, Fair Lawn, NJ (US); Arun Jotshi, Parsippany, NJ (US); Weiwei Duan, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/867,798

(22) Filed: Jul. 19, 2022

(65) Prior Publication Data
US 2022/0351008 A1    Nov. 3, 2022

Related U.S. Application Data

(63) Continuation of application No. 16/995,228, filed on Aug. 17, 2020, now Pat. No. 11,423,258.

(51) Int. Cl.
*G06F 18/214* (2023.01)
*G06N 3/04* (2023.01)
(Continued)

(52) U.S. Cl.
CPC .......... *G06F 18/2148* (2023.01); *G06F 18/41* (2023.01); *G06N 3/04* (2013.01);
(Continued)

(58) Field of Classification Search
CPC ....... G06F 18/2148; G06F 18/41; G06N 3/04; G06N 3/08; G06N 3/045; G06V 10/22; G06V 10/82; G06V 20/10; H04W 16/18
See application file for complete search history.

(56) References Cited

U.S. PATENT DOCUMENTS 8,994,591 B2    3/2015 Dupray et al.
10,860,115 B1 * 12/2020 Tran ...................... G06F 3/0346
(Continued)

FOREIGN PATENT DOCUMENTS

CN    109544544 A  *  3/2019  ........... G06N 3/0454
CN    108984932 B  * 11/2022  ............. G06F 30/13
WO  WO-2020121020 A1 *  6/2020  ........... H04L 41/145

OTHER PUBLICATIONS

Dornsife, Dana et al., Automatic Generation of Precisely Delineated Geographic Features from Georeferenced Historical Maps Using Deep Learning; USC Spatial Sciences Institute; Aug. 17, 2017, pp. 1-14.
(Continued)

*Primary Examiner* — Qun Shen
(74) *Attorney, Agent, or Firm* — GUNTIN & GUST, PLC; Andrew C. Gust

(57) ABSTRACT

Aspects of the subject disclosure may include, for example, obtaining user input identifying a first user-identified network feature of a training image of a geographical region. The training image and the user-identified feature are provided to a neural network adapted to train itself according to the user-identified features to obtain a first trained result that classifies objects within the image according to the user-identified feature. The training image and the first trained result are displayed, and user-initiated feedback is obtained to determine whether a training requirement has been satisfied. If not satisfied, the user-initiated feedback is provided to the neural network, which retrains itself according to the feedback to obtain a second trained result that identifies an updated machine-recognized feature of the training image. The process is repeated until a training requirement has been satisfied, after which a map is annotated according to the
(Continued)

machine-recognized feature. Other embodiments are disclosed.

20 Claims, 10 Drawing Sheets

(51) Int. Cl.
*H04W 16/18* (2009.01)
*G06N 3/08* (2023.01)
*G06V 10/22* (2022.01)
*G06F 18/40* (2023.01)

(52) U.S. Cl.
CPC .............. *G06N 3/08* (2013.01); *G06V 10/22* (2022.01); *H04W 16/18* (2013.01)

(56) References Cited

U.S. PATENT DOCUMENTS

| | | | |
|---|---|---|---|
| 11,195,057 | B2 | 12/2021 | Zadeh et al. |
| 11,295,131 | B1* | 4/2022 | Dhawan .............. G06F 18/2111 |
| 2008/0253688 | A1 | 10/2008 | Safra et al. |
| 2009/0019081 | A1 | 1/2009 | Safra et al. |
| 2014/0368601 | A1* | 12/2014 | deCharms .............. H04N 7/148 348/14.02 |
| 2018/0095632 | A1 | 4/2018 | Leeman-munk et al. |
| 2018/0276841 | A1* | 9/2018 | Krishnaswamy ...... G06V 10/82 |
| 2018/0308231 | A1 | 10/2018 | Kish et al. |
| 2019/0127985 | A1 | 5/2019 | Dundorf et al. |
| 2019/0320324 | A1 | 10/2019 | Guan et al. |
| 2019/0369742 | A1 | 12/2019 | Ghazanfari |
| 2020/0134439 | A1 | 4/2020 | Turner et al. |
| 2020/0135041 | A1 | 4/2020 | Arslan et al. |
| 2021/0173636 | A1* | 6/2021 | Kolar ........................ G06F 8/62 |
| 2022/0051057 | A1 | 2/2022 | Kounev et al. |

OTHER PUBLICATIONS

Duan, Weiwei et al., Automatic Alignment of Geographic Features in Contemporary Vector Data and Historical Maps; GeoAI'17, Nov. 7-10, 2017, Los Angeles Area, CA, USA, pp. 1-10.

Duan, Weiwei et al., Building Knowledge Graph from Public Data for Predictive Analysis—A Case Study on Predicting Technology Future in Space and Time; BigSpatial_16, Oct. 31-Nov. 3, 2016, Burlingame, CA, USA; pp. 1-7.

Duan, Weiwei et al., Semantic-oriented Misclassification Correction for Object Detection on Georeferenced Raster Maps; Aug. 17, 2020; pp. 1-6.

Duan, Weiwei et al., SRC: A Fully Automatic Geographic Feature Recognition System; Aug. 17, 2020; pp. 1-2.

Lin, Chun et al., Building Linked Data from Historical Maps; CEUR-WS.org/Vol- 2184/paper- 07.pdf; Aug. 17, 2018; pp. 1-8.

Uhl, Johannes et al., Extracting Human Settlement Footprint from Historical Topographic Map Series Using Context-Based Machine Learning; Aug. 17, 2020; pp. 1-6.

Uhl, Johannes et al., Map Archive Mining: Visual-analytical Approaches to Explore Large Historical Map Collections; ISPRS Int. J. Geo-Inf. 2018, 7, pp. 1-20.

\* cited by examiner

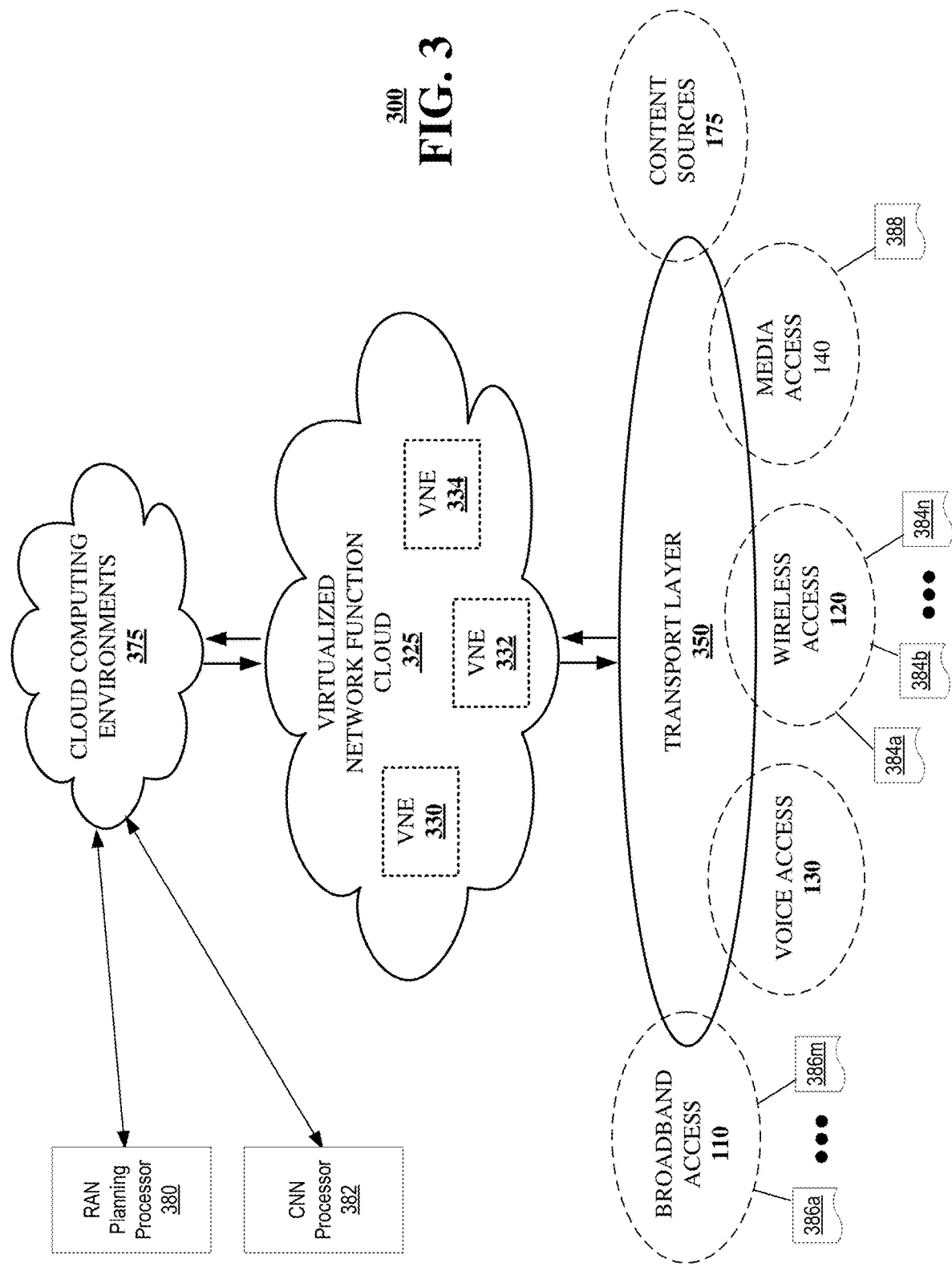

AI-BASED, SEMI-SUPERVISED INTERACTIVE MAP ENRICHMENT FOR RADIO ACCESS NETWORK PLANNING

CROSS REFERENCE TO RELATED APPLICATIONS

This application is a continuation of U.S. patent application Ser. No. 16/995,228 filed on Aug. 17, 2020. All sections of the aforementioned application are incorporated herein by reference in their entirety.

FIELD OF THE DISCLOSURE

The subject disclosure relates to artificial intelligence-based, semi-supervised interactive map enrichment for radio access network planning.

BACKGROUND

Image classification without human intervention may be utilized in various applications, such as self-driving vehicles, facial recognition and robotics, to name a few. According to current practices, an automatic image classification system may be trained according to a set of training images that are suitably labeled with a single category. The system, having been trained, is subsequently asked to predict that category for a novel set of test images. Accuracy of the predictions may be measured and used to evaluate performance of the system.

Image classification systems include convolutional neural networks (CNN) adapted to process the set of training images to obtain training results, which may be compared to the single category identified within the labeled data. Training in this manner requires large numbers of training images, each having been pre-labeled, e.g., by a human. According to a machine learning process, the CNN may adapt itself according to the training result. Such adaptations represent refinements, such that after having repeated the process for a sufficiently large number of times, the suitably trained CNN may reliably recognize a category of an object in a novel image not provided within any images encountered in the training process.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
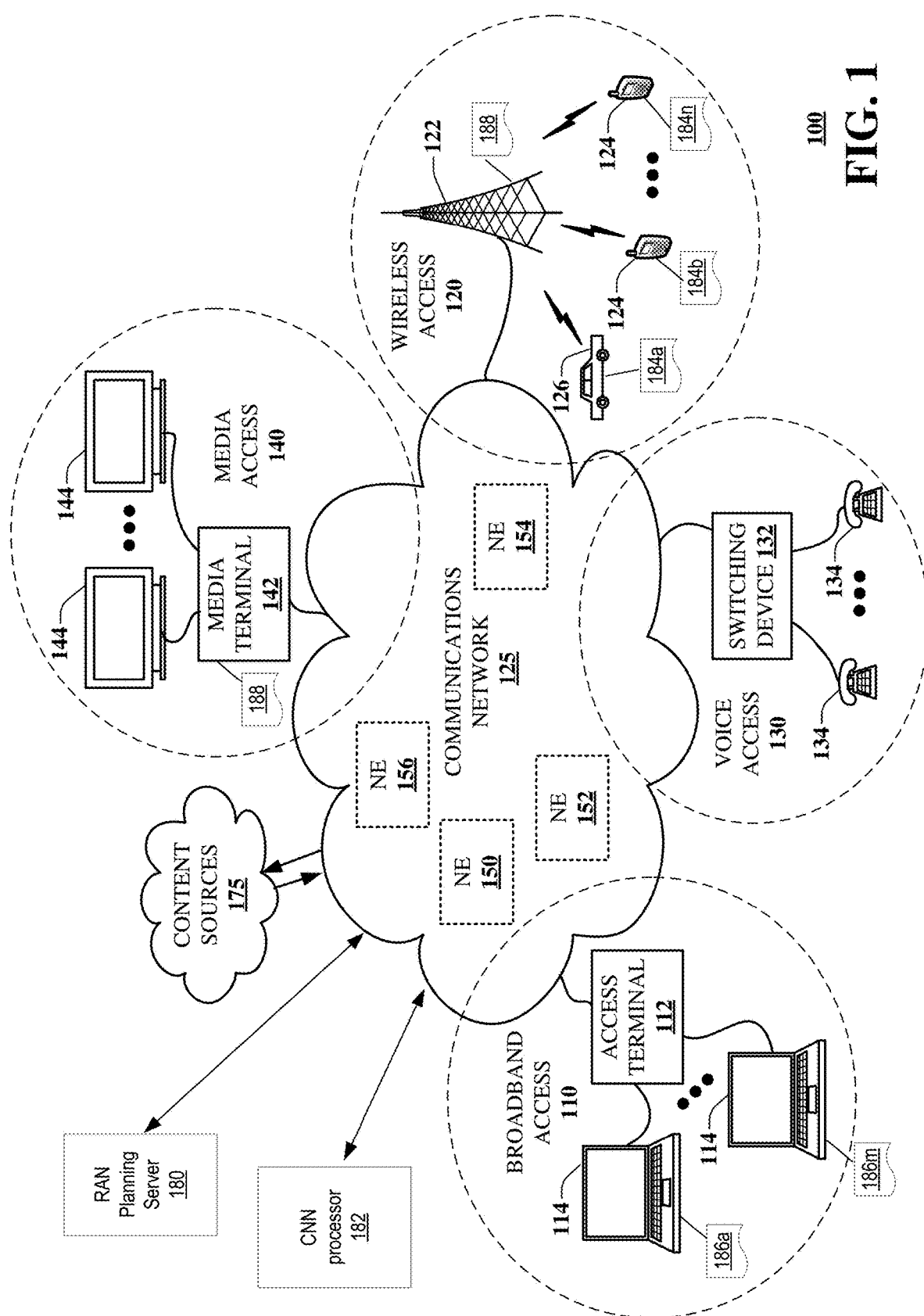
FIG. 1 is a block diagram illustrating an exemplary, non-limiting embodiment of a communications network in accordance with various aspects described herein.

The subject disclosure describes, among other things, illustrative embodiments for AI-based, semi-supervised interactive map enrichment for radio access network planning, in which maps and/or images are annotated according to user input to identify one or more categories of interest. The annotations are used to train an AI system, e.g., including a CNN, to perform categorizations, which are, in turn, presented for user evaluation. User feedback to the presented evaluations is obtained and used to improve performance of the AI system, e.g., the CNN, according to an iterative process, until an acceptable level performance is achieved. Once AI system has been suitably trained, a map or collection of maps and/or images may be enriched based on categorizations and/or identifications of features obtain via AI-based processes.

The illustrative embodiments disclosed herein include applications in which AI-based system processes radio network planning images, e.g., obtained via satellite, aerial observation and/or ground survey, to identify one or more features relevant to radio network operations and/or planning. For example, geographical maps may be enriched by identifying locations of potential antenna mounting structures, such as antenna masts, utility poles, street signs, traffic lights, and/or buildings. In at least some instances, enrichment may include identification features relevant for radio link planning, such as buildings, vegetation including trees, other existing RF equipment, e.g., antennas, that may pose potential blockage and/or interference to a particular deployment, Other embodiments are described in the subject disclosure.

One or more aspects of the subject disclosure include a process for annotating a map. The process includes receiving, by a processing system including a processor, input from user equipment. The input identifies a first wireless network feature of a number of wireless network features of a training image of a geographical region to obtain a user-identified feature. The process also includes training, by the processing system, a neural network according to the training image and the user-identified feature to obtain a first trained result that identifies a machine-recognized feature of the training image. The training further includes sending, by the processing system, the training image and the first trained result to the user equipment for display at a display device, resulting in a displayed training result. User-initiated feedback is received by the processing system from the user equipment. The user-initiated feedback is received responsive to the displayed training result. A training score is determined, by the processing system, responsive to the user-initiated feedback. Responsive to the training score not satisfying a training requirement, the neural network is re-trained, by the processing system, according to the training image and the user-initiated feedback to obtain a second trained result that identifies an updated machine-recognized feature of the training image. Responsive to the training score satisfying a training requirement a map is annotated, by the processing system, according to the machine-recognized feature to obtain an annotated map.

One or more aspects of the subject disclosure include a non-transitory, machine-readable medium including executable instructions that, when executed by a processing system including a processor, facilitate performance of operations. The operations include obtaining input from user equipment, the input identifying a first network feature of a plurality of network features of a training image of a geographical region to obtain a user-identified feature. The operations further include training a neural network according to the training image and the user-identified feature to obtain a first trained result that identifies a machine-recognized feature of the training image. The training further includes providing the training image and the first trained result for display at a display device, resulting in a displayed training result, obtaining, from the user equipment, user-initiated feedback responsive to the displayed training result, and determining a training result responsive to the user-initiated feedback. Responsive to the training score not satisfying a training requirement, the neural network is re-trained according to the training image and the user-initiated feedback to obtain a second trained result that identifies an updated machine-recognized feature of the training image. Responsive to the training result satisfying a training requirement a map is annotated according to the machine-recognized feature to obtain an annotated map.

One or more aspects of the subject disclosure include a device including a processing system having a processor and a memory that stores executable instructions. The executable instructions, when executed by the processing system, facilitate performance of operations that include obtaining input from user equipment, the input identifying a first network feature of a number of network features of a training image of a geographical region to obtain a user-identified feature. The training image and the user-identified feature are provided to a neural network adapted to train itself according to the training image and the user-identified features to obtain a first trained result that identifies a machine-recognized feature of the training image. The training further includes providing the training image and the first trained result for display at a display device, resulting in a displayed training result, obtaining, from the user equipment, user-initiated feedback responsive to the displayed training result, and determining a training result responsive to the user-initiated feedback. Responsive to the training result not satisfying a training requirement, providing the user-initiated feedback to the neural network adapted to re-train itself according to the user-initiated feedback to obtain a second trained result that identifies an updated machine-recognized feature of the training image. Responsive to the training result satisfying a training requirement, annotating a map according to the machine-recognized feature to obtain an annotated map.

Planning of cellular networks requires taking into account a variety of features regarding the environment and of geospatial entities. For a network planner, it could be useful to detect poles and other potential mount locations and add them to the map, to find possible locations for cellular antennas. Discovering obstructions to cellular transmissions, such as buildings and vegetation could be useful, when deciding where to position antennas. Existing maps are often incomplete and lack many important features. Many of these features could be discovered from satellite, aerial or other images. Adding features to maps, such as poles, buildings, satellite dishes, etc., may be accomplished manually. However, using humans for this is labor intensive, expensive and slow. It is conceivable that traditional machine-learning techniques may be employed. Using traditional machine-learning techniques require large training sets prepared with pre-labeled data, training, and validation. Such a process would be costly, slow and inflexible.

According to traditional machine-learning techniques, training images and test images may be obtained from a common set of pre-labeled images. Training sets of this kind generally include very large numbers of training images, each image having been evaluated and pre-labeled beforehand. Numbers of images can range into tens of thousands. One such example is a standard dataset used in computer vision and deep learning, referred to as the Modified National Institute of Standards and Technology (MINST) dataset handwritten digit classification problem. The dataset includes 60,000 small square 28×28 pixel grayscale images of handwritten single digits between 0 and 9. The task is to classify a given image of a handwritten digit into one of 10 classes representing integer values from 0 to 9, inclusively. Reports indicate that systems may achieve classification accuracies of above 99%. Unfortunately, such training sets require vast numbers of pre-labeled data. Although some standardized training sets are available, they are limited in both number and scope.

According to the novel techniques disclosed herein, an interactive process is applied, in which users mark on a map and/or images, examples of areas containing one or more entities of interest. In at least some embodiments, the user also marks on the maps/images other examples of areas without such entities. A neural network (NN) can be applied to learn where there are entities that are of interest and where there are no such entities. For example, the user marks the areas where there are trees and areas where there are no trees, and the system uses that to learn and return other areas with trees. The system is interactive and dynamic. If the learning result is inaccurate, due to insufficient examples, the user can label additional "good" and "bad" examples, and the system retrain its model, to achieve more accurate results; building up on previous learnt model.

According to the techniques disclosed herein, a system may be adapted to dynamically learn entities that are relevant to a specific city or area—entities that may affect network planning, like man-made constructions, large boulders, vegetation, etc.—Different features may require a different learning rate. In at least some embodiments, a learning rate and/or other learning parameters may be adjusted by examining how accurate are the results based on user input provided according to an interactive labeling process. Consequently, map enrichment may be used to add geospatial entities to the map, e.g., detecting a new pole and adding it to the map, and to add annotations to existing entitles, e.g., add to a building a label saying it has a glass exterior, or annotating buildings with large antennas, labeling buildings with a helicopter landing pad on their rooftop, etc.

Beneficially, the techniques disclosed herein apply a novel machine learning approach, in which a machine may be trained sufficiently, without requiring the large numbers of training images typically required by other systems. At least one approach utilizes an iterative process to categorize images, e.g., by adding and/or labeling features or objects portrayed in an image. Examples disclosed herein generally relate to radio access network (RAN) planning, in which categorized features may include wireless antennas, antenna mounting structures, such as masts, buildings, utility poles, hilltops, and the like. Such features may be used by RAN planners to identify suitable locations for locating infrastructure, such as antennas, base station terminals, and the like. In at least some embodiments, the categorized features may include objects that might otherwise impede and/or interfere with RAN operation. Examples include, without limitation, buildings, trees, hilltops, and the like. It is envisioned that suitably trained systems employing the techniques disclosed herein may evaluate maps and/or images, such as aerial (i.e., drone) and/or satellite images, to categorize features portrayed within the images as may be useful to RAN planning activity.

Referring now to FIG. 1, a block diagram is shown illustrating an example, non-limiting embodiment of a communications network 100 in accordance with various aspects described herein. For example, communications network 100 can facilitate in whole or in part receiving user data that labels one or more objects within a training image as a category of interest and applying the user data and the training image to a CNN to obtain a trained result. The trained result may identify other machine-recognized features within the training image according to the category of interest. The trained result may be presented at a display device, allowing the user to evaluate accuracy of the machine-recognized features. User-initiated feedback, e.g., identifying positive results (i.e., successful categorizations) and/or negative results (i.e., mis-categorizations) may be provided to the CNN, which is adapted to re-evaluate the same image and/or a different image according to the user-initiated feedback. The process may be repeated for multiple iterations, e.g., until a suitable performance is achieved, after which the suitably trained CNN may be applied to other novel images. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In some embodiments, such as the example system 100, a RAN planning server 180 is in communication with one or more mobile devices 124, 126 and/or static devices, e.g., 114, and/or media terminals 142. The RAN planning server 180 may be adapted to facilitate in whole or in part map enrichment for RAN planning. In at least some embodiments, the RAN planning server 180 obtains one or more images of a region to be evaluated for RAN planning purposes and provides at least some of the one or more images to user equipment for evaluation, e.g., labeling. The example system 100, further includes a neural network, illustrated as a CNN processor 182. The CNN may be in communication with the RAN planning server 180. Alternatively or in addition, the CNN processor 182 may be in communication with one or more mobile devices 124, 126 and/or static devices, e.g., 114, and/or media terminals 142, and/or other components of the communication network 125, e.g., one or more of the network elements 150, 152, 154, 156. In at least some embodiments, the RAN planning server 180 may be adapted to facilitate in whole or in part AI-based, semi-supervised interactive map enrichment for RAN planning.

In at least some embodiments, the mobile devices 124, 126 may include resident functionality 184*a*, 184*b*, . . . 184*n*, generally 184, e.g., in the form of any one of an operating system, a client, a resident app, and combinations thereof. The resident functionality may be adapted to perform one or more of the techniques disclosed herein, such as presentation of RAN site planning images and/or maps, presentation of interactive user interfaces adapted to accept user feedback. The feedback may include labeling, e.g., identification of one or more categories of interest, feedback to machine-categorizations, e.g., in a form of positive feedback identifying correct categorizations and/or negative feedback identifying incorrect categorizations and/or features that may have been missed in any machine categorization, as discussed further below. In at least some embodiments, the resident functionality 184 operations in cooperation with external functionality, e.g., functionality of other mobile devices and/or services and/or systems. For example, the resident functionality provides client functionality of a client-server arrangement, in which server functionality is provided by another device, such as the RAN planning server 180 and/or the CNN processor 182.

Likewise, the stationary devices 114 may be adapted with functionality 186*a* . . . 186*m*, generally 186, and the media terminal 142 adapted with functionality 188, in the form of any one of an operating system, a client, a resident app, and combinations thereof. The resident functionalities 186, 188 may be adapted to perform one or more of the techniques disclosed herein, such as presentation of RAN site planning images and/or maps, presentation of interactive user interfaces adapted to accept user feedback. The feedback may include labeling, e.g., identification of one or more categories of interest, feedback to machine-categorizations, e.g., in a form of positive feedback identifying correct categorizations and/or negative feedback identifying incorrect categorizations and/or features that may have been missed in any machine categorization. In at least some embodiments, one or more of the functionalities 186, 188 operate in cooperation with external functionality, e.g., functionality of other devices and/or services and/or systems. For example, the functionality 186 and/or 188 may provide client functionality of a client-server arrangement, in which server functionality is provided by another device, such as the RAN planning server 180 and/or the CNN processor 182. In some embodiments, the stationary devices 114 and/or the media terminal 142 may include network enabled devices, such as smart appliances, and the like implementing machine-type communications. It is envisioned that one or more stationary devices 114 and/or the media terminal 142 may be adapted to facilitate one or more of the presentation of RAN site planning images and/or maps, presentation of interactive user interfaces adapted to accept user feedback, acceptance of user labeling, and/or feedback to machine-categorizations.

In some embodiments, functionalities of one or more of the RAN planning server 180 and/or the CNN processor 182 may be implemented in whole or in part on one or more of the mobile devices 124, 126, on one or more of the stationary devices 114 and/or one or more of the media terminals 142. Accordingly, it is envisioned that in at least some embodiments, one or more of the RAN planning server 180 and/or the CNN processor 182 may not be required, as their respective functionalities may be implemented on other elements of the system 100, such as the network elements 150, 152, 154, 156, the mobile terminals 124, 126, the stationary devices 114 and/or the media terminals 142.

Figure 2A:
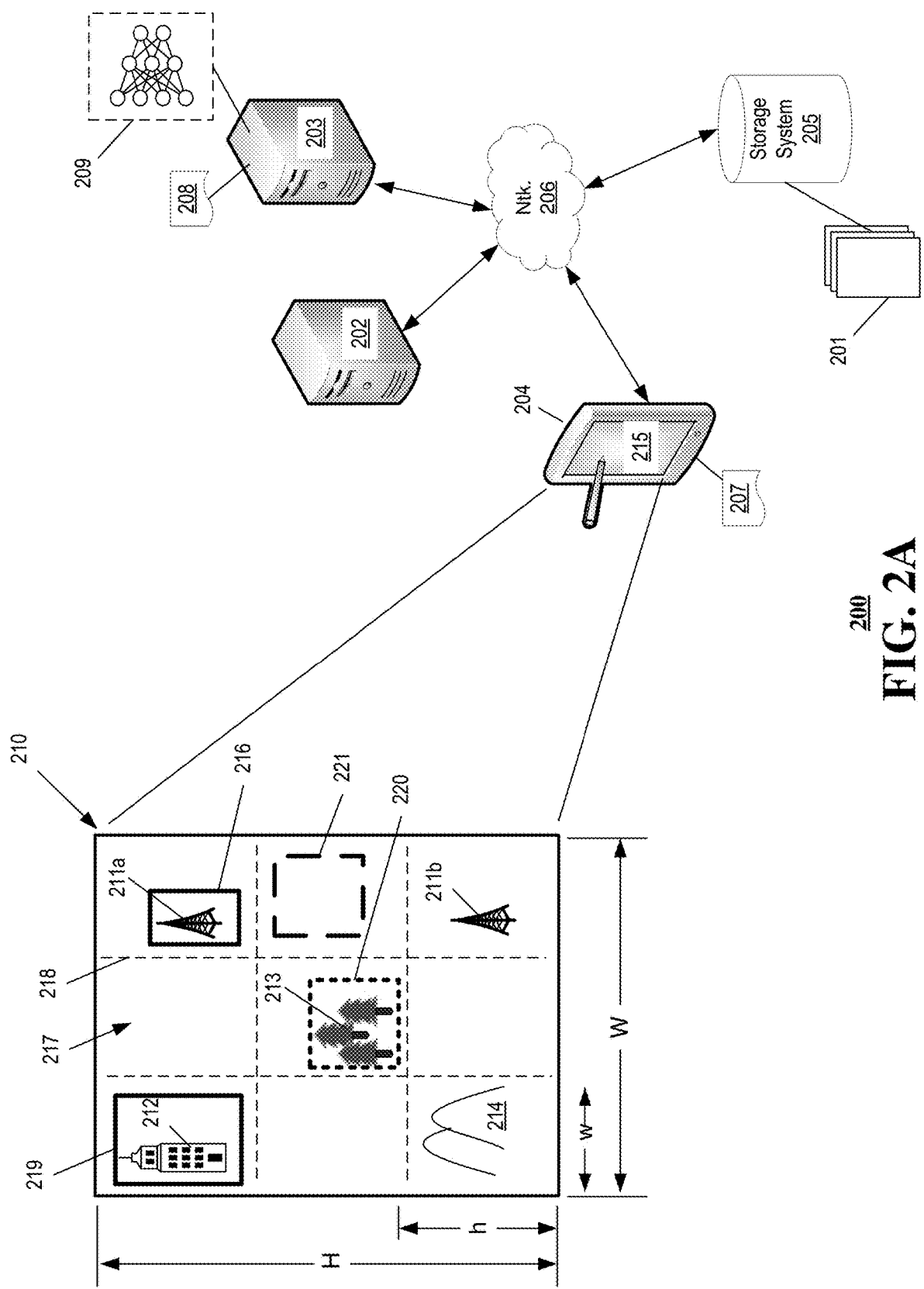
FIG. 2A is a block diagram illustrating an example, non-limiting embodiment of an AI-based, semi-supervised interactive image analysis system functioning within the communication network of FIG. 1 in accordance with various aspects described herein.

FIG. 2A is a block diagram illustrating an example, non-limiting embodiment of an AI-based, semi-supervised interactive image analysis system 200 functioning within the communication network of FIG. 1 in accordance with various aspects described herein. The system includes a RAN planning processor 202 adapted to facilitate AI-based, semi-supervised interactive analysis of images, such as maps used in association with planning, maintaining, and/or evaluation performance of RAN links and/or associated infrastructure. The example system 200 further includes a neural network, namely a CNN processor 203, a RAN planning user device 204, a storage system 205 and at least one network 206 adapted to facilitate communications between and/or among one or more of the RAN planning processor 202, the CNN processor 203, the RAN planning user device 204 and the storage system 205.

The RAN planning processor 202, and/or the CNN processor 203 may include a processing device, such as a server, a workstation, a personal computer that may provide dedicated functionality and/or functionality shared with other applications. In some embodiments, the processing devices 202, 203 may include stationary devices, e.g., back-end devices positioned within a data processing facility, a data center, a core network, and so on. Alternatively or in addition, the processing devices 202, 203 may include mobile devices, such as a laptop computer, a tablet processor and/or a mobile communication device, such as a smartphone. Likewise, the RAN planning user device 204, may include similar stationary devices and/or a mobile devices.

The storage system 205 may include a dedicated storage device providing long-term storage, and/or short-term storage. The storage device may include one or more of a hard-disk drive, e.g., magnetic storage, an optical storage device, e.g., a CD and/or DVD storage device, an electronical storage device, e.g., a flash-drive, a memory stick, RAM, EEPROM, and the like. Storage of data in the storage system 205 may be organized according to a file server system, a database, a catalogue and the like.

It is understood that one or more of the RAN planning processor 202, the CNN processor 203, the RAN planning user device 204 and the storage system 205 may be implemented within a common device. For example, the RAN planning processor 202 may be adapted to include functionality of the CNN processor 203. Likewise, the RAN planning processor 202 may include local storage adapted to store and/or retrieve data according to operation of AI-based, semi-supervised interactive image analysis. The example RAN planning user device 204 is adapted to provide supporting functionality, such as presentation of RAN planning maps and/or images, acceptance of user input, e.g., input that labels a map and/or image according to a category of interest, presentation of machine-generated categorizations and/or acceptance of user input providing feedback to any machine-generated categorizations. The functionality may be in the form of machine-readable instructions at least partly resident within the RAN planning user device 204, e.g., a user application or RAN planning app 207.

The CNN processor 203 may include local storage adapted to store and/or retrieve data according to operation of AI-based, semi-supervised interactive image analysis. The example CNN processor 203 can be adapted to provide supporting CNN functionality, such a CNN functionality 208 adapted to implement machine learning, e.g., according to AI. The CNN functionality 208 can be trained according to the techniques disclosed herein to categorize RAN planning maps and/or images according to one or more categories of interest. The CNN functionality 208 may categorize a map and/or image, e.g., a photograph, according to user input. The CNN functionality 208 may be trained according to the map and/or image together with user-provided labels. The CNN functionality 208 may be adapted to provide machine-generated categorizations and/or acceptance of user input to the same image, e.g., providing feedback to any machine-generated categorizations, and/or to different images, e.g., novel images to which the CNN functionality may not have been trained.

The CNN functionality 208 may generate and/or otherwise update a neural network 209. The neural network 209 may include one or more nodes that may be organized according to a layered structure that includes a mapping of interconnections between the one or more nodes. Activations in one layer generally influence activations in another layer. The nodes of the neural network 209 may have associated weights and/or biases that may affect activations among the layers. It is understood that during a training process, including the user-assisted iterative process disclosed herein, one or more of the nodes, the layering of the nodes, interconnections of the nodes and/or weights and biases may be determined and/or otherwise modified according to a training phase of the process. Once trained, the neural network 209 may be considered as a model adapted to evaluate images according to a particular category of interest, e.g., to classify features portrayed within the images according to the category(ies) of interest. In at least some embodiments, one or more of the maps, images, and/or model(s) determined by the CNN functionality 208 may be stored at the CNN processor 203 and/or at one or more of the RAN planning processor, the user device 204 and/or the storage system 205 as stored items 201.

An example training image 210 is provided, which includes a number of features. Namely, the training image 210 includes a first antenna mast 211a, a second antenna mast 211b, a building 212, a tree and/or group of trees 213 and a hill and/or mountain 214. The training image 210 has a corresponding size, defined in the illustrative example, as a width W and a height H. The width and/or height may be defined according to a number of pixels. Alternatively or in addition, the width and/or height may be defined according to a reference display size and/or a reference viewport, such as an open window of a display 215 of the RAN planning user device 204.

In operation, a first RAN planning task may include identification of any suitable antenna mounting entities that may be portrayed within the image 210. According to the illustrative example, a user observing the image 210 at the display 215 may identify the first antenna mast 211a as a suitable antenna mounting entity. For example, the RAN planning app 207 may present a graphic user interface (GUI) adapted to accept user input identifying an entity of interest, in this instance, an antenna mast. In some embodiments, the GUI accepts user-definition of a first border 216 around a portion of the image 210 including the first antenna mast 211a. User input may include a location and/or size of the border 216. In at least some instances, instructions are provided to the user to draw the border 216 to include the entity of interest, while including as little else. For example, the border 216 is drawn in a relatively tight fashion so as to include as small a region of the image 210 as necessary to include the antenna mast 211a.

Alternatively or in addition, the image 210 may be subdivided into an arrangement of image segments or tiles 217. According to the illustrative example, and without limitation, the image 210 is segmented into an arrangement of nine, non-overlapping tiles 217, arranged in a 3×3 grid. In at least some embodiments, the GUI is adapted to provide a user indication of the segments, e.g., providing dashed segment borders 218, although such user indications may not be necessary. A user may select a location including an entity of interest, e.g., pointing to the first antenna mast 211a. In at least some embodiments, a border 216 may be determined according to a boarder 218 of an image segment 217 including the antenna mast 211a. In such instances, a boarder 218 of the selected image segment 217 may be highlighted and/or otherwise identified at the GUI, e.g., over the image 210 to provide an indication to the user of the image border 216, in this example, a size of the image segment including the antenna mast 211a. The example image segments have a corresponding width w and height h, i.e., w×h, that may be determined in a like manner to the overall image size, W×H.

It is understood that the image segments 217 of the image 210 may be determined according to a common, i.e., uniform size and shape. For example, the image segments may be defined according to the same shape, e.g., a rectangle, a square, a triangle, a parallelogram, e.g., a diamond, or more generally, any regular polygon, e.g., hexagon, and so on. Alternatively or in addition, segments may be defined according to more than one different shapes, e.g., triangles, parallelograms and/or hexagons. The sizes may be uniform, or they may differ.

In some embodiments, the sizes and/or shapes of the image segments may be pre-configured. For example, images processed by the CNN functionality 208 may begin according to a 3×3 segmentation of the original image 210. Alternatively or in addition, the size and/or shape of the image segments may be user-defined. For example, a user may select and/or otherwise instruction that the original image 210 be processed according to a particular arrangement of image segments 217, e.g., a uniform 3×3 grid. In some embodiments, segmentation may be determined in response to user identification of an entity of interest. For example, a user manipulating the GUI may delineate a border 216 about the first antenna mast 211a. In response to the delineated boarder 216, the RAN planning app 207 may segment the image according to a suitable arrangement to accommodate a size, shape and/or location of the entity of interest, i.e., the first antenna mast 211a. To the extent the resulting boarder, e.g., the segment boarder 220, does not include the entire antenna mast 211a, the GUI may be adapted to allow a user to manipulate the image, e.g., sizing, scaling and/or translating it such that the selected image segment 217 includes an entirety of the entity of interest.

It is envisioned that an arrangement of the image segments 217 may be determined according to the CNN functionality 208. For example, the segment size and/or shape may be set according to predetermined parameters, e.g., all machine learning beginning according to a 3×3 rectangular arrangement. Such predetermined parameters may include pixel size, e.g., w×h pixels. Alternatively or in addition, the predetermined parameters may be determined to an absolute size of the image, and/or a relative size of the image, e.g., according to a corresponding display area and/or viewport.

Although a size, shape and/or arrangement of image segments may be established or otherwise fixed at one point in time, it is understood that such arrangements of segments may be modified, e.g., during implementation of the machine learning process. For example, the CNN functionality 208 may begin a machine-learning process according to a relatively coarse segmentation, e.g., the example 3×3 grid.

It is understood that the initial segmentation, e.g., determined according to a default segmentation as may be established according to one or more of the CNN functionality, 208, a capability of the user device 204, and/or a user selection and/or preference as might otherwise be identified in a user profile. According to an implementation of the machine-learning process, the default segmentation may be refined. For example, one or more of the shape, size and/or number of segments may be modified. The modifications may include a refinement, in which a size of the segments is reduced and/or a number of segments is increased for the image 210. Such modifications may be responsive to earlier machine-learning results.

For example, a user may determine that the training is proceeding well and opt to modify segmentation to expedite processing. A user may choose to increase a size of each tile 217 and/or reduce a number of tiles of the image 210. Such reduction in numbers of tiles may expedite processing by the CNN functionality 208 as fewer tiles would be processed. Likewise, a user may determine that the training is unacceptable and opt to modify segmentation to refine and/or enhance processing. In this regard, the user may choose to reduce a size of each tile 217 and/or increase a number of tiles of the image 210. Such an increase in the numbers of tiles may enhance accuracy of image classifications by increasing processing time required by the CNN functionality 208 as a greater number of tiles would be processed for the same image 210.

In at least some embodiments, such modifications of a size, shape, number and/or arrangement of image tiles 217 may be determined according to a policy, a rule and/or logic. For example, a rating, ranking and/or score may be determined according to a performance of the CNN functionality in classifying entities of interest. Such a rating, ranking and/or score may be evaluated, e.g., compared to a threshold value, to determine whether the performance is sufficiently reliable. To the extent it is unreliable, the segmentation may be modified according to an algorithm to enhance a quality of the results perhaps at the expense of processing time. The algorithm may be based on one or more of a current arrangement of segments, a default arrangement of segments, a capability of the user device 204, a subscription level of a subscriber to a RAN evaluation service and the like. For example, tile size may increased and/or decreased, as the case may be, by a factor, e.g., a factor of two, and the machine-learning process repeated with the modified tile size. Alternatively or in addition the tile size may be increases and/or decreased according to a percentage. It is understood that the factor and/or percentage of any such modification may be determined according to a capability of the user device, and/or a user preference, such as an identified processing time. Consider a user selecting that each training step be accomplished in less than a threshold time, e.g., 30 seconds. A tile size modification may be selected according to the algorithm to ensure that the threshold time is not exceeded.

In operation, the training image 210 may be presented on the display 215, allowing a user to select and/or otherwise identify a region of the image 210 that includes the first antenna mast 211a. The image 210 may be segmented according to any of the example segmentation scenarios disclosed herein to obtain multiple image segments 217. In at least some embodiments, each of the image segments 217 may be processed individually by the CNN functionality 208 as if it were a test image. The results for each segment may be displayed independently, e.g., sequentially as machine-learning results are obtained by the CNN functionality 208.

Alternatively or in addition, the results obtained for individual image segments 217 may be collected and presented at the display 215 as an updated image that includes machine-learned results.

The machine learned results may indicate other regions of the image, e.g., other segments and/or features portrayed within the image delineated by a respective border 219. A user may inspect the results to determine whether the CNN functionality 208 has correctly and/or sufficiently applied prior training to other features within the image 210. According to the illustrated example, the user identifies the $1^{st}$ antenna mast 211a as an entity of interest. The user input and the image are provided to the CNN functionality 208, which trains the neural network 209 according to the user input and applies the training to other segments of the image. In this instance, the neural network 209 has identified a building 212 as a suitable location for mounting an antenna. To the extent the building is appropriate, and it may be, the training may be considered successful. However, to the extent the build is not suitably similar, namely, to the extent a user wished to distinguish between antenna masts and buildings, the user may provide feedback, e.g., via the GUI, to indicate that the machine-learned result 219 is incorrect.

In at least some embodiments, the user feedback is provided as a negative example, that the identified structure does not correspond to the entity of interest. The negative feedback may be provided to the CNN functionality 208 that may continue according to a machine-learning process to updated the neural network 209. The process may be repeated in an iterative manner, processing different segments of the image and returning results. The process may continue until a sufficiently reliable result is obtained. Alternatively or in addition, the process may continue until there is nothing more to be obtained from the image. In at least some embodiments, the CNN functionality 208 and/or the RAN planning processor 202 may determine that processing should continue according to a different image. For example, the image may provide a limited number of entities of interest and/or other entities. Once the limited number have been learned, the process may be applied to another test image including user indication of the entity of interest. Alternatively or in addition, the process may continue according to a novel image and provide results. The user may continue to provide feedback until the neural network 209 has been sufficiently trained.

Once trained, the process can transition from a learning mode in which the CNN functionality 208 revises and updated the neural network 209 to an operational mode in which the trained neural network 209, or model, is applied to novel images to obtain classifications of entities of interest. It is understood that performance may vary according to image quality, terrain variances, image perspectives, time of day lighting, and the like. Accordingly, it is understood that operations may transition from an operational mode to a training mode to enhance and/or otherwise modify or improve performance of the neural network 209. In at least some embodiments, a transition from an operational mode to a training mode may be initiated by a user selection at the GUI. Namely, the user may observe that results are inaccurate, determining that further training is required.

It is understood that in at least some embodiments, training may be determined according to one or more of a type or class of entity of interest. For example, one model 209 may be obtained from a training session in which the model 209 has been trained to classify a particular type of antenna mounting structures, e.g., antenna masts. Another model may be obtained from a different training session in which a different model has been trained to classify a different type of antenna mounting structure, e.g., a building. Another example of this is when in different areas there are different antenna structures, so there might be a need for a different model or to re-train the model. In at least some applications, multiple models may be applied to the same image 210 to identify different features. Classification results may be obtained in common record, e.g., an annotated map or image, stored in the storage system 205 and presented at the user device 204 to facilitate RAN planning.

It is understood that entities of interest for RAN planning may include structures and/or features that may impede performance of a radio link. For example, some structures, such as trees 213 and/or buildings 212 may attenuate and/or block radio transmission. Accordingly, a RAN planner may identify such structures as entities of interest and the classification process implemented as disclosed herein to classify images according to these types of features. For example, a user may identify the trees 213 by drawing a border 220 about the trees and/or selecting an image tile 217 including the trees. In some embodiments, a user may identify a region of the image 210, e.g., according to a border 221, that identifies an area that does not include the entity of interest.

Figure 2B:
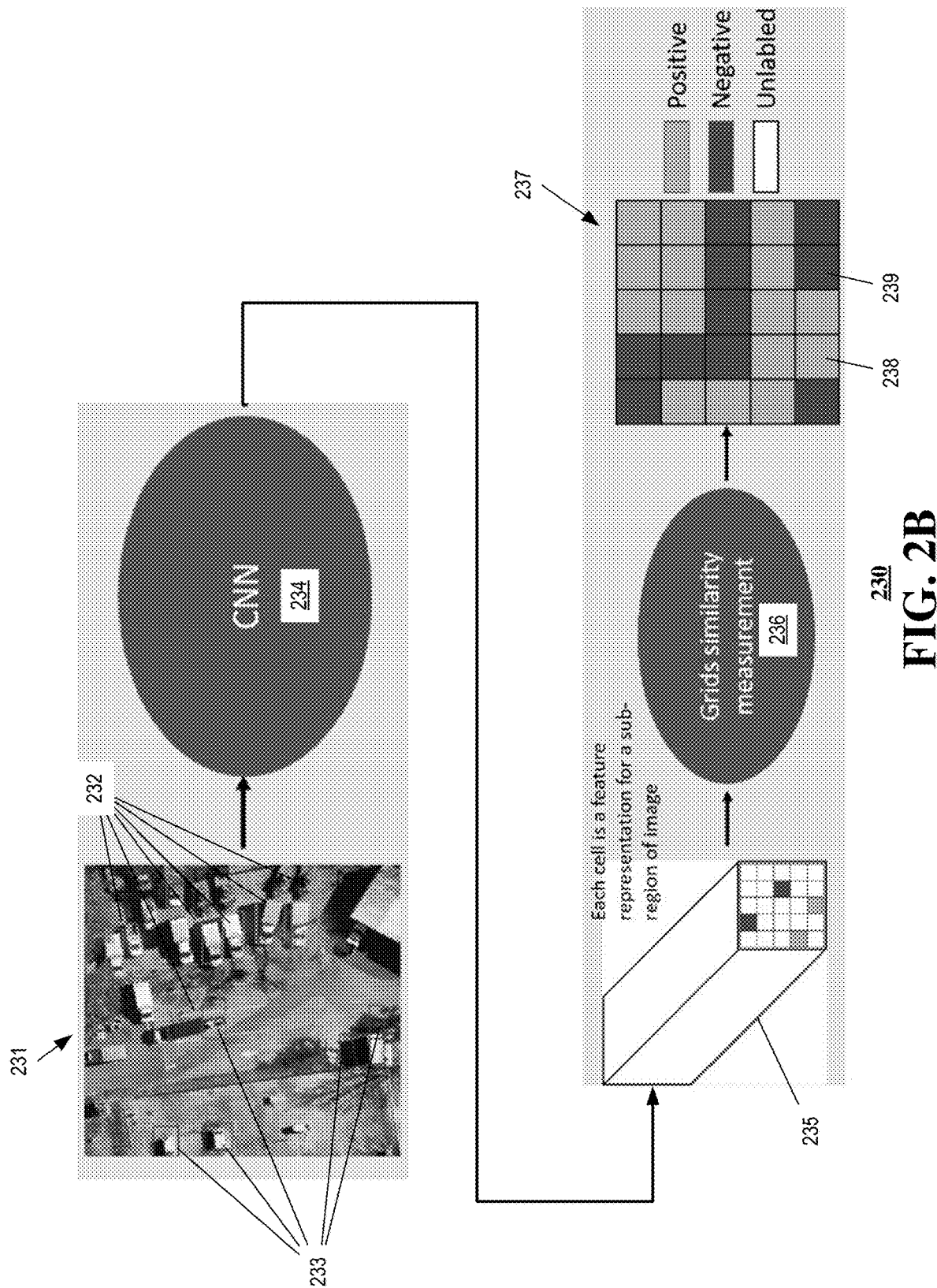
FIG. 2B is a block diagram illustrating an example, non-limiting embodiment of operation of the AI-based, semi-supervised interactive image analysis system of FIG. 2A in accordance with various aspects described herein.

FIG. 2B is a block diagram 230 illustrating an example, non-limiting embodiment of operation of the AI-based, semi-supervised interactive image analysis system of FIG. 2A in accordance with various aspects described herein. According to the illustrative example, a training image 231 is a satellite image of an area containing multiple vehicles, buildings and/or portions of buildings, a roadway and so on. The image may be presented at a user display and the user may identify entities of interest using a GUI. According to the illustrative example, the user has marked some of the vehicles as entities of interest. The marking includes first highlighted borders 232, e.g., rectangles, drawn about regions of the image including the identified entities of interest. The first borders 232 are sized and oriented to bound the entity of interest, without including any additional portions of the image than otherwise necessary to bout the entity of interest. In at least some embodiments, the user may mark other entities observable within the image that are not entities of interest. Such marking may be performed in a similar manner, e.g., obtaining second highlight borders 233 that are distinguishable from the first borders 232, e.g., according to a color, a style, and so on. For example the first borders 232 may be green and/or solid lines, whereas, the second borders may be red and/or dashed or dotted lines. According to a training phase, the image and the user input is provided to a CNN 234. The CNN 234 processes cells according to sub-regions of the image 231 to obtain a trained model 235.

The process may be repeated as necessary on the same image and/or on different images. A grid similarity measurement may be performed at 236 in which sub-regions of the image are evaluated to determine whether they include the trained feature of interest, e.g., a positive result, a feature that is not the trained feature of interest, e.g., a negative result, and possibly sub-regions that have not been labeled, e.g., they have not been evaluated and/or they do not include features that have been identified and/or otherwise classified. In at least some embodiments, sub-regions of the image are identified in a classification map 237 that distinguishes positive sub-regions 238 and negative sub-regions 239.

Figure 2C:
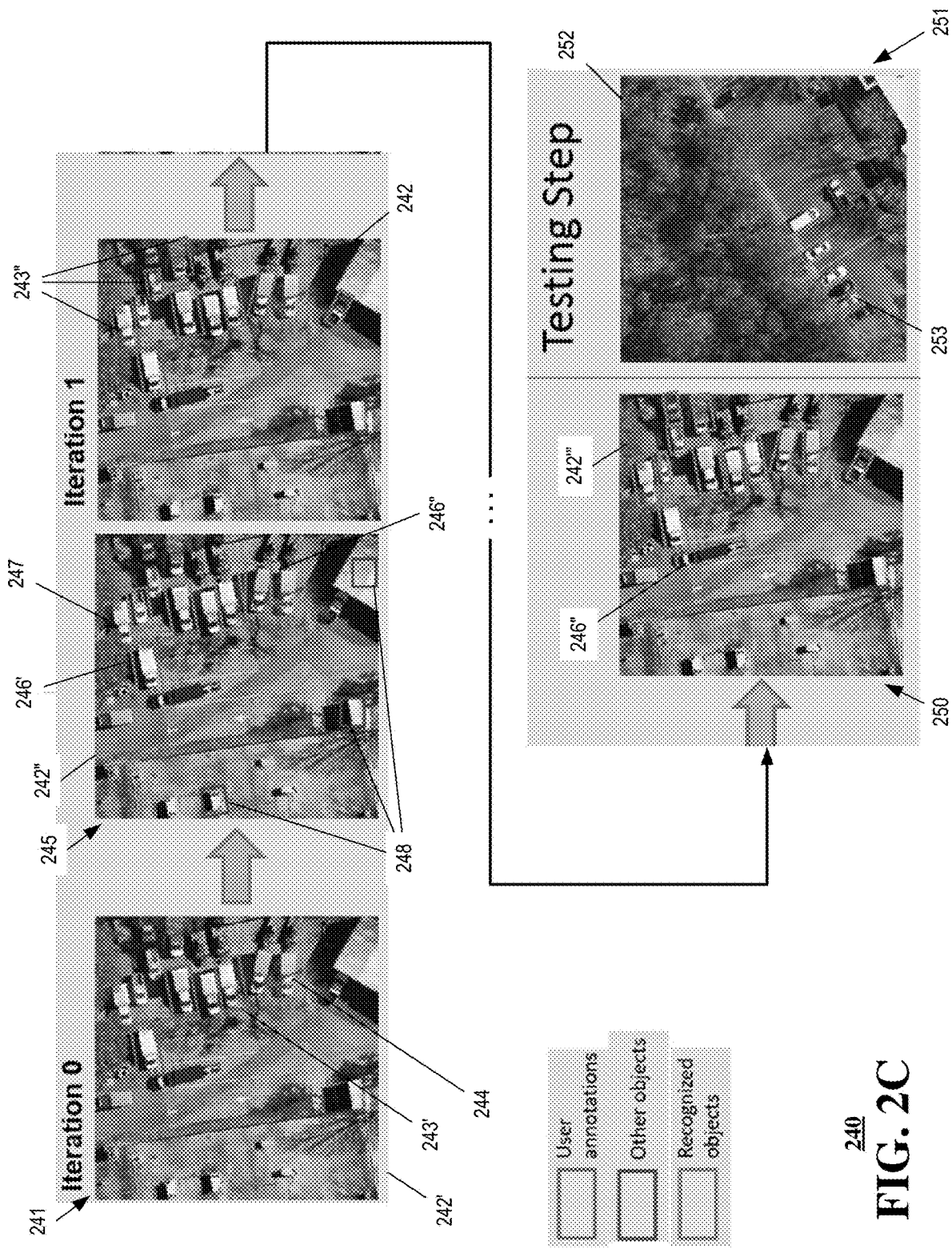
FIG. 2C is a block diagram illustrating another example, non-limiting embodiment of operation of the AI-based, semi-supervised interactive image analysis system of FIG. 2A in accordance with various aspects described herein.

FIG. 2C is a block diagram 240 illustrating another example, non-limiting embodiment of operation of the AI-based, semi-supervised interactive image analysis system of FIG. 2A in accordance with various aspects described herein. According to a first iteration 241, a first image 242', e.g., a photographic satellite image, is presented at a display of a user device. The user, with the assistance of a GUI, identifies several examples of an entity of interest within the image. According to the illustrative example, the user has caused borders to be drawn about the entities of interest, namely, three borders 243' drawn about three vehicles portrayed within the first image 242'. The image includes at least one other entity of interest 244 that was not identified by the user. The user annotations 243' are provided together with the first image 242' to CNN functionality 208 (FIG. 2A). According to a training phase, the CNN functionality trains a neural network 209 (FIG. 2A) according to the user annotations 243'.

The trained neural network 209 is subsequently applied to the first image 242' to obtain a first classification result, which is portrayed as machine-generated annotations of the first image 242' Namely, the annotations include first annotations 246' corresponding to the original the user annotations 243', as well as additional annotations 246" identifying recognized or classified objects corresponding to machine-recognized features according to the entity of interest. The classification result includes other features, e.g., a vehicle 247, that were not yet recognized. According to the illustrative example, the classification result includes other recognized objects 248 that have not been classified according to the entity of interest.

The first iteration results, together with the annotations 246', 246",248 are presented at the display of the user device. The user, with the assistance of the GUI, identifies one or more additional examples of the entity of interest that have not yet been recognized within the first image 242' by the CNN functionality 208. According to the illustrative example, the user has caused borders to be drawn about the additional entities of interest, namely, three borders 243" drawn about several other, as yet unrecognized, vehicles portrayed within the first image 242'. The user annotations 243" are provided together with the first image 242' to CNN functionality 208, which according to the training phase, re-trains, or otherwise updates, the neural network 209 according to the supplemental user annotations 243".

According to a second iteration 245, the re-trained neural network 209 is further applied to the first image 242' to obtain a second classification result 242'", which is portrayed as machine-generated annotations 246" of the first image 242' Namely, the annotations include second annotations 246" corresponding to the earlier user annotations 243', 243", as well as additional annotations 246" identifying recognized or classified objects corresponding to machine-recognized features according to the entity of interest. The classification result includes other features, e.g., a vehicle 246", that were not yet recognized.

At this point, e.g., having determined that the trained neural network 209 has accurately identified the entities of interest within the first image 242', without identifying other objects and/or misidentifying any other objects, the user and/or the RAN analysis application, and/or the CNN functionality 208 may transition from a learning phase to a testing phase. According to the testing phase, a different image 252 is processed by the CNN functionality 208 according to the trained neural network 209. An output includes the different image 252 together with machine-generated annotations 253 of machine classifications of any entities of interest within the different imaged 252. According to the illustrative example, a number of vehicles have been correctly classified and identified. Having further concluded that the trained model is functioning with a sufficient degree of precision and/or reliability, the system may transition from a testing phase to an operational phase in which other novel images may be processed and annotated in a like manner to identify entities of interest according to the AI.

Figure 2D:
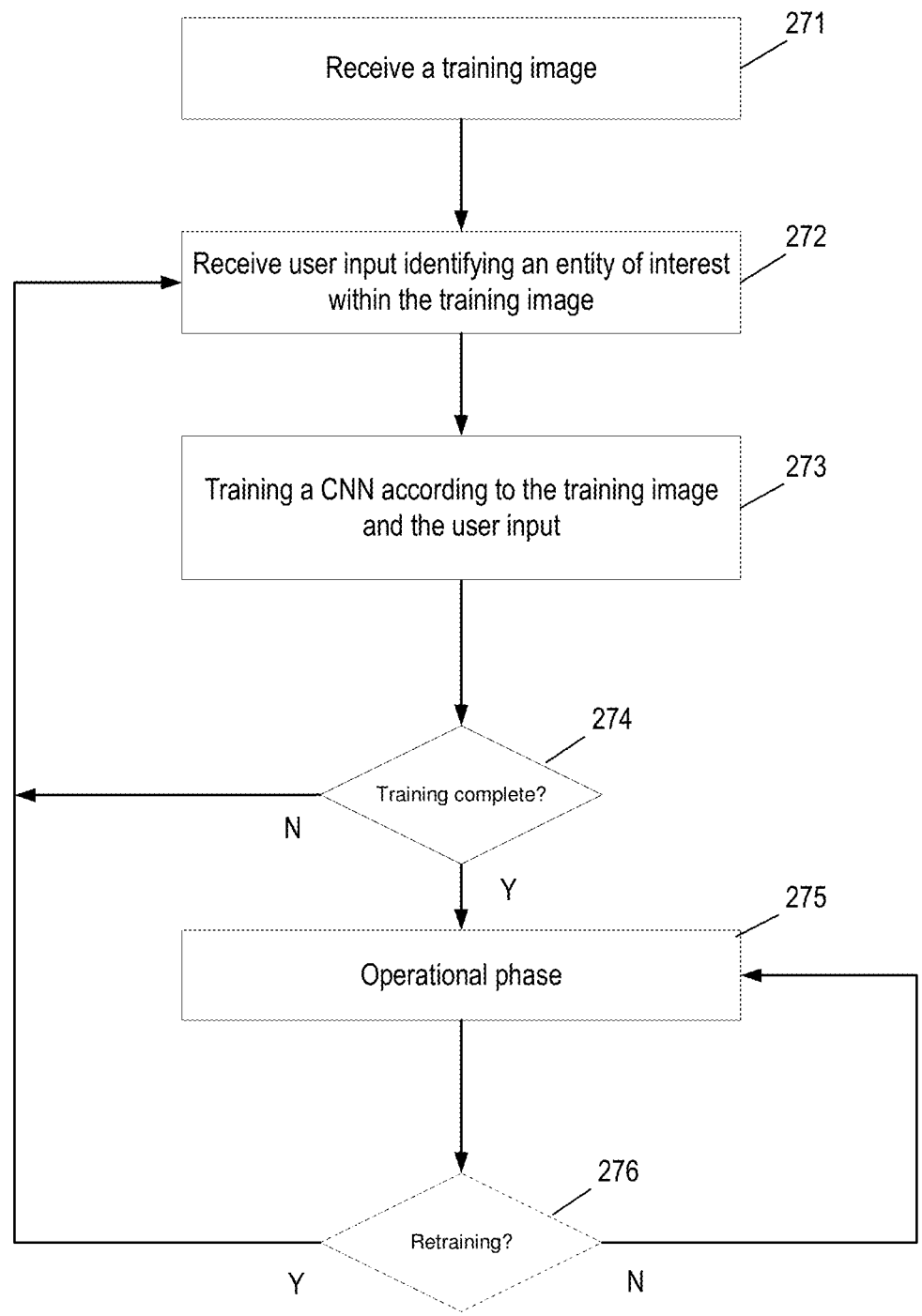
FIG. 2D depicts an illustrative embodiment of an AI-based, semi-supervised interactive image analysis process in accordance with various aspects described herein.

FIG. 2D depicts an illustrative embodiment of an AI-based, semi-supervised interactive image analysis process 270 in accordance with various aspects described herein. A training image is received at 271.

User input is obtained at 272. The user input may include a photographic image, e.g., selection of an image from an image database, that identifies at least one entity of interest within the training image. For RAN planning applications, images may include aerial photographs as may be obtained from aircraft, e.g., drones, and/or satellite images as may be available in online databases, such as Google Earth.

A CNN is trained according to the training image and the user input at 273. Namely, the CNN processes the training image to train a neural network given the image and a user annotation of an entity of interest. It is understood that the training image may include many objects that may include other, not yet identified, entities of interest as well as other objects. The trained neural network may be reapplied to the same training image to obtain machine-identified objects within the training image. Some of the objects may be entities of interest, whereas others may be different objects, e.g., mischaracterized by the trained neural network.

A determination is made at 274 as to whether the training has been completed. For example, a user may evaluate the original training image along with machine-generated annotations of classified objects. To the extent it is determined at 274 that training has not been completed, e.g., the machine-generated annotations missed entities of interest and/or mis-classified other entities, the process continues from 273, obtaining supplemental user input identifying an entity of interest within the training image.

To the extent it is determined that training has been completed at 274 that training has been completed, e.g., that the machine-generated annotations adequately and/or sufficiently identified the entities of interest, the process 270 proceeds to an operational phase at 275. Adequacy and/or sufficiency may be established according to a positive threshold. For example, the positive threshold may be set according to correct classifications, e.g., ranging from complete classification of all entities of interest, to some acceptable fraction of classification, e.g., 90%, 75%, anything above 50%, and so on. Alternatively or in addition, adequacy and/or sufficiency may be established according to a negative threshold. For example, the negative threshold may be set according to incorrect classifications, e.g., ranging from no mis-classification, to some acceptable fraction of mis-classification, e.g., 10%, 25%, anything below 50%, and so on. It is understood that the thresholds may be determined according to a rating, e.g., good, fair, poor, and/or according to a ranking or score, e.g., percentage(s) of correct/incorrect classifications.

In at least some embodiments, the process 270 determined at 276 (shown in phantom) as to whether further training, e.g., retraining, may be necessary. To the extent it is determined at 276 that further training/re-training is necessary, the process 270 continues from 272, receiving user input identifying an entity of interest within a training image. The evaluation may be determined according to the positive threshold, the negative threshold and/or a combination of positive and negative thresholds. In some embodiments, it is understood that the actual thresholds applied such threshold evaluations may vary. For example, certain environments, such as dense urban environments may prove particularly challenging. Accordingly, the thresholds may be reduced, allowing for some misses. It is understood that the process may be performed according to relatively loose thresholds to identify candidate regions, while excluding others. The process may then be repeated, e.g., for a subset of images according to more stringent thresholds depending upon results of the initial pass with the less stringent thresholds.

To the extent it is determined at 276 that further training/re-training is unnecessary, the process 270 continues according to the operational phase at 275.

In at least some embodiments, the determining whether retraining is necessary 276 may be repeated. For example, the process 270 may accept user feedback indicating that additional training/re-training may be necessary. A user may observe at some time during the operational phase 275 that machine generated classifications of objects may be inaccurate and/or incorrect. In at least some embodiments, the GUI provides a user selectable button to initiate/re-initiate a training/re-training. The process 270 may proceed and/or otherwise revert to the training phase at 272 based upon the last image processed. Alternatively or in addition, the process 270 may proceed according to a different test image.

It is envisioned that a neural network 209 (FIG. 1) trained according to images obtained in a first region may not perform satisfactorily when applied to images obtained from a different region. Consider a system trained according to images obtained from a suburban or rural landscape. Although the system may perform admirably with novel images of similar landscapes, the system may be challenged when presented with an image obtained from an urban landscape. Accordingly, retraining may be necessary. As performance may be expected to vary according to different landscapes, it is understood that the same model may be retrained according to the different landscapes, to obtain a refined neural network 209. Alternatively, a new model may be obtained from a neural network 209 trained according to the different landscapes, e.g., to obtain different models for different landscapes.

The different models developed according to such different regions and/or landscapes may be stored separately and used depending upon which environment the user is evaluating. In some embodiments, selection of an appropriate trained model may be made by a user selection at the GUI. Alternatively or in addition, the appropriate model may be selected based upon geocoordinates associated with the image and/or image set of a particular region to be evaluated. Such geocoordinates may be automatically assessed in association with terrain maps, geopolitical data, e.g., city limits, population density, property values, and the like. Alternatively or in addition the appropriate model may be selected according to machine learning, e.g., to generally identify building density, building height, vegetation, and the like.

Figure 2E:
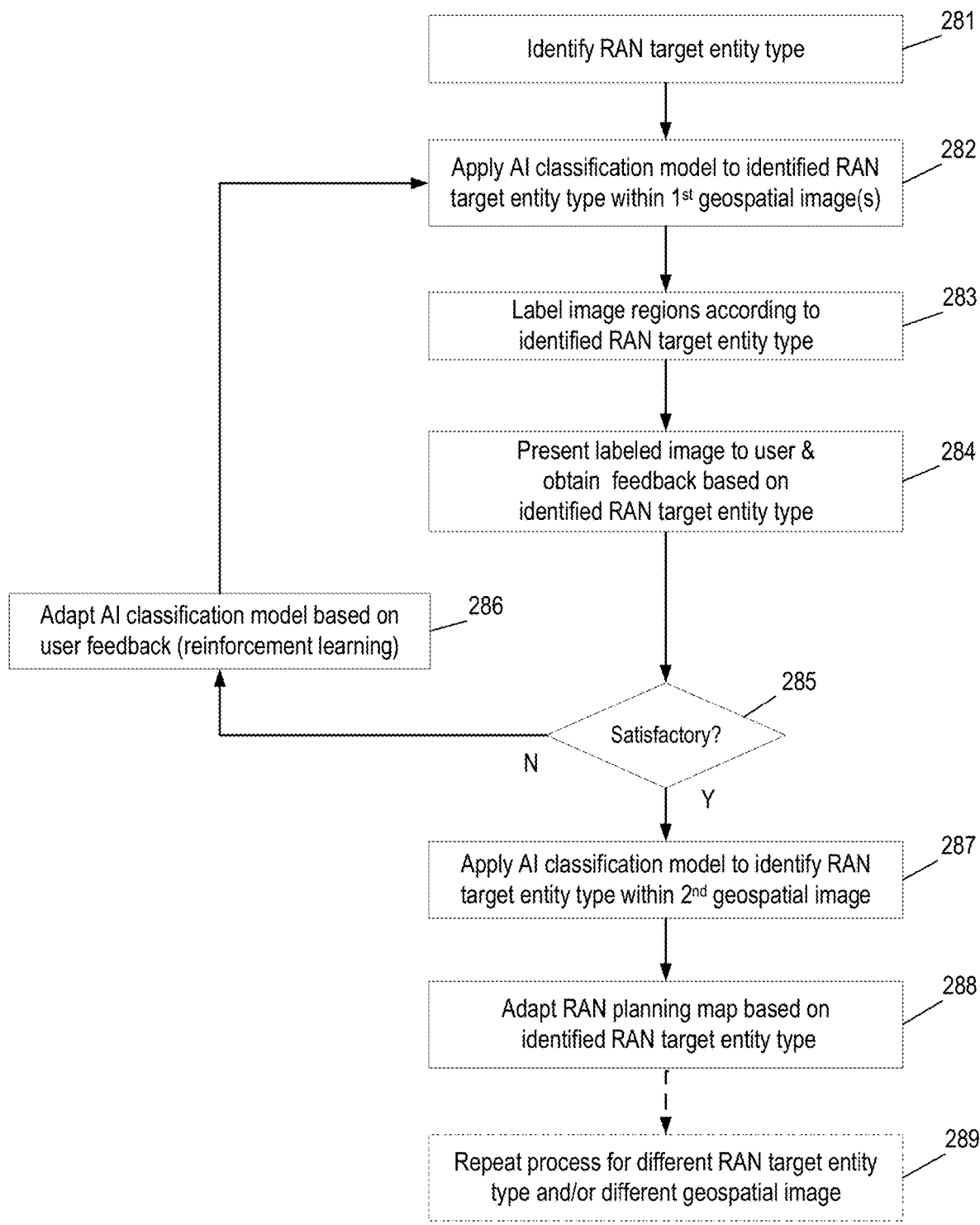
FIG. 2E depicts an illustrative embodiment of an AI-based map enrichment process in accordance with various aspects described herein.

In at least some embodiments, the processes disclosed herein can be applied to detection and classification of physical entities, such as network elements, from geo-referenced images. FIG. 2E depicts an illustrative embodiment of an AI-based map enrichment process 280 in accordance with various aspects described herein. The process 280 may be used to enrich maps, photographs, charts, graphic displays, video and the like, by providing additional information in an automated and/or semi-automated fashion. Without limitation, the additional information may be in a form of descriptive information, e.g., textual content and/or symbols. The descriptive information is related to a geolocation and/or a feature and/or region of a map, photograph, chart, etc. The descriptive information may identify a feature, an entity, and/or more generally a characteristic associated with a particular geolocation. For example, textual information may provide a description of an entity portrayed in a captured image of the corresponding location. The description may include one or more words, phrases, including abbreviations and/or acronyms. For example, textual information of an antenna tower or mast, may include the phrase "Antenna Tower," or the word "Tower", or the abbreviation "ANT." Alternatively or in addition, symbolic information may include a symbol, such as a symbol of an antenna tower, a utility pole, a building, etc. In at least some embodiments, symbolic information may include a line, a curve, and/or a polygon that may be provided proximate to and/or bounding a corresponding entity, feature or characteristic at the corresponding geolocation.

It is envisioned that in at least some embodiments, the information may be encoded to distinguish between different types of categories. For example, descriptive information associated with categories suitable for antenna locations may be encoded according to a particular color, e.g., "Green", and/or a particular font, e.g., "Bold". Similarly, descriptive information associated with categories that may problematic and/or challenging for RAN planning may be encoded according to a particular color, e.g., "Red", and/or a particular font, e.g., "Italics" and/or "Highlight."

The additional information may be positioned proximate to its corresponding geolocation according to the map, photograph, chart, etc. For example, a map may be annotated according to the descriptive information resulting in a annotated map. In at least some embodiments, the descriptive information may be provided as an overlay to a map, e.g., retained in a separate graphical entity adapted to position the descriptive information according to corresponding geolocation(s) when overlaid upon the map. Alternatively or in addition, the information may be retained separately from the geolocation, e.g., in a metadata portion of a map, photograph, chart, video, and/or in a table or catalog of features. It is understood that any recordings of enriching content in such a separate manner may include associated geocoordinates and/or other suitable locating reference points, e.g., features within the map, photograph, chart, video, etc.

According to the process 280, a target entity and/or type of entity, is identified at 281. For the illustrative RAN planning example, the target entity includes an entity relevant to RAN planning, operation and/or maintenance, referred to generally as a RAN target entity type. Identification of the RAN target entity type may include one or more of a textual description, e.g., accepting a text entry and/or selection from a dropdown list obtained via a user interface. Alternatively or in addition, identification of the RAN target entity type may include an identification of an image, a portion of an image, e.g., a particular grid of an image portioned into sub images according to a grid structure. For example, a user may select one or more grids that include the target entity.

According to the process 280, an image to be evaluated, is processed in an automated fashion at 282, e.g., according to a classifier that may include AI, to identify and/or categorize features portrayed within the image according to the target entity. The AI may include a processing and/or evaluation of the image using a NN and/or a CNN. Based on an application of the AI, the image may be annotated and/or otherwise marked or labeled, e.g., at 283, to identify RAN target entities according to the user selection. For example, the image is labeled by highlighting, e.g., drawing a circle, a polygon or box, around an identified RAN target entity. Identification of the RAN target entities may be referred to generally as classification.

A labeled squared region is shown to the user and the user acknowledges or changes the label. After showing several examples to the user, for regions that are not part of the initial training set, if the user feedback is different from the classification, the classification model is re-trained. This can continue until the classification is accurate and the user does not provide negative feedback (no incorrect classification anymore).

The labeled image may be presented for display to obtain user feedback at 284 via user equipment, e.g., according to a user interface and/or a display device. For example, the labeled image may include the original image or copy thereof with boxes drawn about image features classified according to the RAN target entity. User input may be obtained responsive to the display, e.g., via the user interface. The user input provides feedback that may acknowledge a correct characterization, and/or may identify an incorrect characterization and/or may identify one or more additional RAN target entities within the same image that may have been missed or overlooked by the AI process.

Training the NN is according to several labeled regions. In some regions the geospatial entity exists and in other it does not exist. For example, in some images there is a utility pole and in others there is no utility pole. The classifier learns to label regions correctly. For example, the user marks regions representing positive examples, e.g., regions that contain a communication tower, such positive markings sometimes referred to as positive labels. Alternatively or in addition, the user marks regions representing negative examples, e.g., regions that do not contain a communication tower, such negative markings sometimes referred to as negative labels. Any such marking and/or labeling may be used as training set, e.g., an initial training set, to train the NN. The classifier, e.g., the NN, may be improved in a like manner according to an interactive process.

For example, a determination is made at 285 as to whether the classifier results are satisfactory. To the extent the results are not satisfactory, e.g., the classifier missed one or more target entities and/or mischaracterized one or more entities within the image. A threshold for satisfactory results may be predetermined, e.g., according to a number of correct and/or incorrect classifications, a percentage of correct and/or incorrect classifications, and the like. Alternatively or in addition, a determination of satisfactory results may be made upon an objective determination by the user. For example, a user may simply identify that the results are acceptable, e.g., by providing an input via a user interface.

To the extent it is determined at 285 that the classifier results are unsatisfactory, the processes 280 repeats steps 282 through 284, again returning to step 285 to determine whether the results are satisfactory. The process 280 may continue until it is determined at 285 that satisfactory results are obtained. Alternatively or in addition, the process may conclude that satisfactory results are obtained after repeating steps 282 through 285 for some maximum number of allowable repeats, and/or according to an associated elapsed time exceeding a threshold.

To the extent it is determined at 285 that the classifier results are satisfactory, the process 280 applies a suitably trained classifier to a second image at 287 to identify the RAN target entity or entities within the second image. A RAN map, image, chart, or similar planning asset is adapted at 288 according to the classified RAN target entities. For example, when the RAN target entity is a radio tower, a RAN planning map is annotated to identify radio towers within a corresponding image. It is understood that the image may be any image portraying a geographic region to be evaluated, such as a satellite image, an aerial image, an image obtained at ground level, etc., including images obtained via a geospatial information system. In some embodiments, the RAN planning map is the geospatial image adapted to include enriching content, such as text, symbols, and/or highlighting, according to classification results obtained via the process 280. Alternative or in addition, the RAN planning map is separate from the geospatial images, potentially covering a region spanned by multiple such geospatial images. It is envisioned that the process 280 may be repeated at 289. Such repetitions may be according to different RAN target entities and/or different geospatial images.

Maps may include, without limitation topographic maps that may include imagery (NAIP), roads, place names, man-made structures, hydrography, and possibly elevation contours and boundaries. Such maps may include digital raster graphics and/or digital line graphs, e.g., according to a vector data format developed and distributed by the U.S. Geological Survey. Alternatively or in addition, the maps may include a digital surface module, such as an elevation model that includes the top of buildings, tree canopy, powerlines and other features above the bare earth, and/or a bare earth model elevation model representing a surface of the Earth without features like houses, bridges and trees. It is understood that a registration process may be used to align and/or otherwise associate regions, entities, and/or features among one or more of the maps, images, charts, videos, and the like. For example, registration may include, without limitation, alignment or assignment of coordinates from a non-projected coordinate system to a coordinate system.

In general, the training can be based on several labeled regions and not just one region. The regions can be from one or more satellite images. It is also envisioned that in at least some embodiments, user input may include geospatial relationships between entities. For example, streetlights often appear in fixed distances along a road. This feature can be used for knowing where it is likely to search for a streetlight and where it is unlikely. These are features that are provided to the CNN but are based on the geospatial context and not just the image.

Classification may depend upon a technology employed by the RAN. For example, suitable antenna locations and/or possible interferers may depend upon antenna sizes, e.g., 1 meter and above, versus 1 meter and below, antenna styles, e.g., dish, array, long-wire, and corresponding RF propagation characteristics. For example, in newer cellular networks, such as 5G and beyond, the carrier waves operate according to extremely high-frequencies, having shortwave lengths, e.g., on an order of millimeters. Such high-frequency transmissions may be obstructed by vegetation and/or buildings. It is understood that at least a portion of an RF signal may be reflected according to a size, an orientation and/or a reflective property of a structure. In some embodiments, classification may identify features of geospatial entities, such as sizes, construction types and/or materials. For example, a building may be classified as having glass exterior. A suitable annotation may be applied to enrich a RAN planning map, since knowledge of a material on an exterior of buildings may facilitate a RAN planning process by allowing for more accurate computations of reflection.

In at least some embodiments, a machine-learning training process may make use of geospatial relationships. For example, geospatial relationships may be used as constraints in the training process. Constraints may be based on information available within the geo-referenced image itself, such as a roadway, a building, a body of water, a boundary between different regions, such as a shoreline, and so on. Alternatively or in addition, . . . , e.g., unlikely to detect a car in the middle of a lake and likely to detect streetlights at regular spaces along a street. (3) Using the suggested method to adjust existing models to new geographic areas instead of training models from scratch for new areas. For at least these reasons, the disclosed systems and/or processes may be distinguished from routine machine learning algorithms and reinforcement learning.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the example system 200, and the example process 270 presented in FIGS. 1, 2A, 2B, 2C, 2D, 2E and 3. For example, virtualized communication network 300 can facilitate in whole or in part receiving user data that labels one or more objects within a training image as a category of interest and applying the user data and the training image to a CNN to obtain a trained result. The trained result may identify other machine-recognized features within the training image according to the category of interest. The trained result may be presented at a display device, allowing the user to evaluate accuracy of the machine-recognized features. User-initiated feedback, e.g., identifying positive results (i.e., successful categorizations) and/or negative results (i.e., miscategorizations) may be provided to the CNN, which is adapted to re-evaluate the same image and/or a different image according to the user-initiated feedback. The process may be repeated for multiple iterations, e.g., until a suitable performance is achieved, after which the suitably trained CNN may be applied to other novel images.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

In some embodiments, such as the example system 300, a RAN planning processor 380 is in communication with one or more mobile devices 384a, 384b, ... 384n, generally 284 and/or one or more static devices, 386a ... 386m, generally 386. In least some embodiments, such as the example system 300, a CNN processor 382 is in communication with the RAN planning processor 380 and/or with one or more of the mobile devices 384 and/or static devices, e.g., 386, and/or other components of the communication network virtualized network function, e.g., one or more of the virtual network elements 330, 332, 334.

The RAN planning processor 380 may be adapted to facilitate in whole or in part AI-based, semi-supervised interactive map enrichment for RAN planning. For example, the RAN planning processor 380 may, alone and/or in cooperation with one or more of the mobile devices 384, provide RAN site planning images and/or maps for presentation on user equipment. Such presentations may be in cooperation with a user interface adapted to accept user feedback that may include labeling, e.g., identification of one or more categories of interest, and/or feedback to machine-generated categorizations. The CNN processor 382 may be adapted to facilitate in whole or in part a machine-learning process to recognize and/or otherwise categorize features portrayed within RAN planning maps and/or images. The feedback may include positive feedback identifying correct categorizations and/or negative feedback identifying incorrect categorizations and/or features that may have been missed in any machine categorization. The CNN processor 382 having suitably trained a model may provide the model to one or more of the RAN planning processor 380 and/or the one or more mobile devices 384 to evaluate other novel RAN planning maps and/or images without necessarily requiring further assistance of the CNN processor 382.

Figure 4:
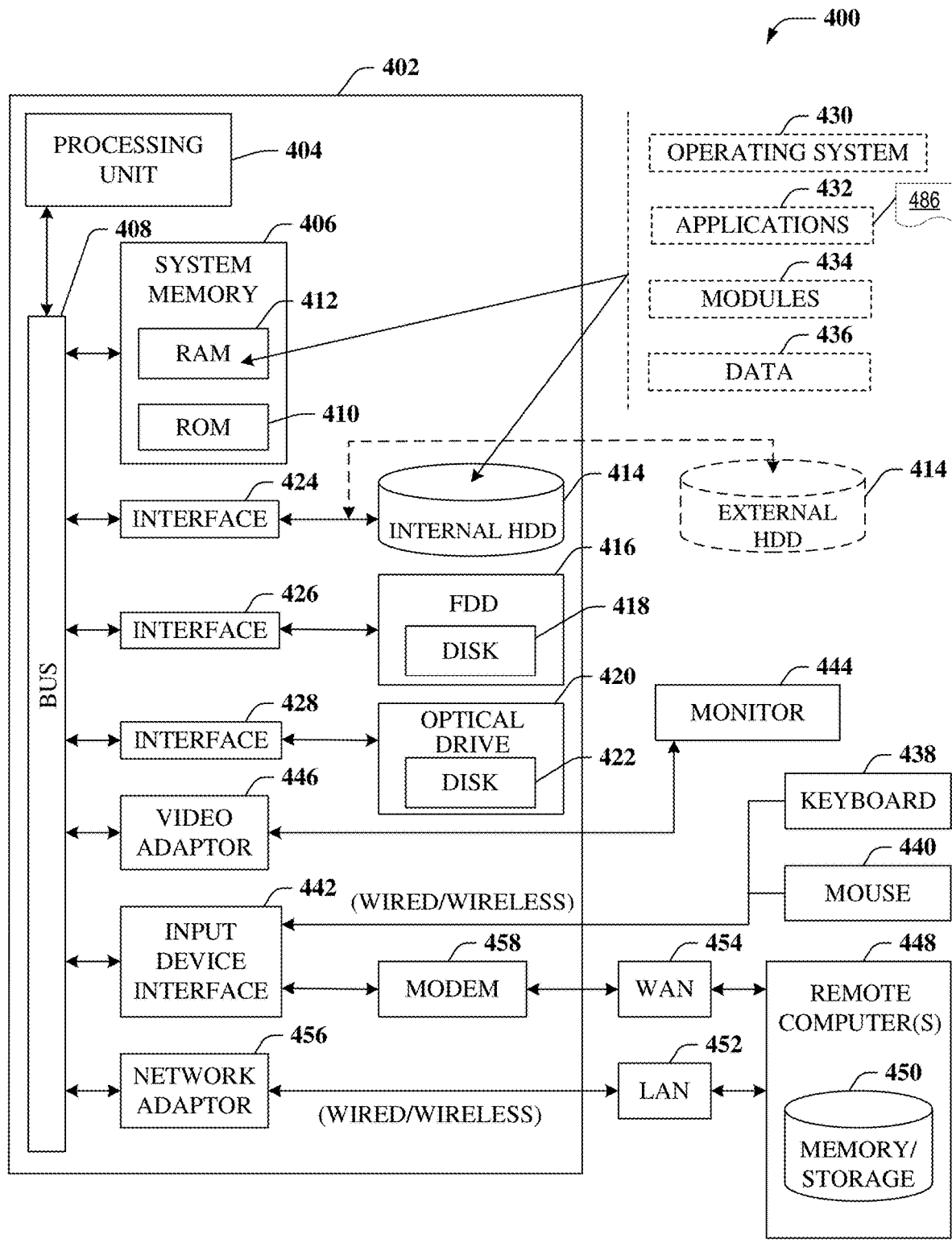
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving user data that labels one or more objects within a training image as a category of interest and applying the user data and the training image to a CNN to obtain a trained result. The trained result may identify other machine-recognized features within the training image according to the category of interest. The trained result may be presented at a display device, allowing the user to evaluate accuracy of the machine-recognized features. User-initiated feedback, e.g., identifying positive results (i.e., successful categorizations) and/or negative results (i.e., mis-categorizations) may be provided to the CNN, which is adapted to re-evaluate the same image and/or a different image according to the user-initiated feedback. The process may be repeated for multiple iterations, e.g., until a suitable performance is achieved, after which the suitably trained CNN may be applied to other novel images.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT and or 100BaseT wired Ethernet networks used in many offices.

When used in AI-based, semi-supervised interactive map enrichment for RAN planning, the computer 402 can include one or more applications 432 that may be adapted to perform one or more of the techniques disclosed herein, such as functionality of one or more of the RAN planning server 180, 380, the CNN processor 182, 382, and user equipment adapted to present maps and/or images and to obtain user input in a form of labeling and/or feedback to machine-generated categorizations.

Figure 5:
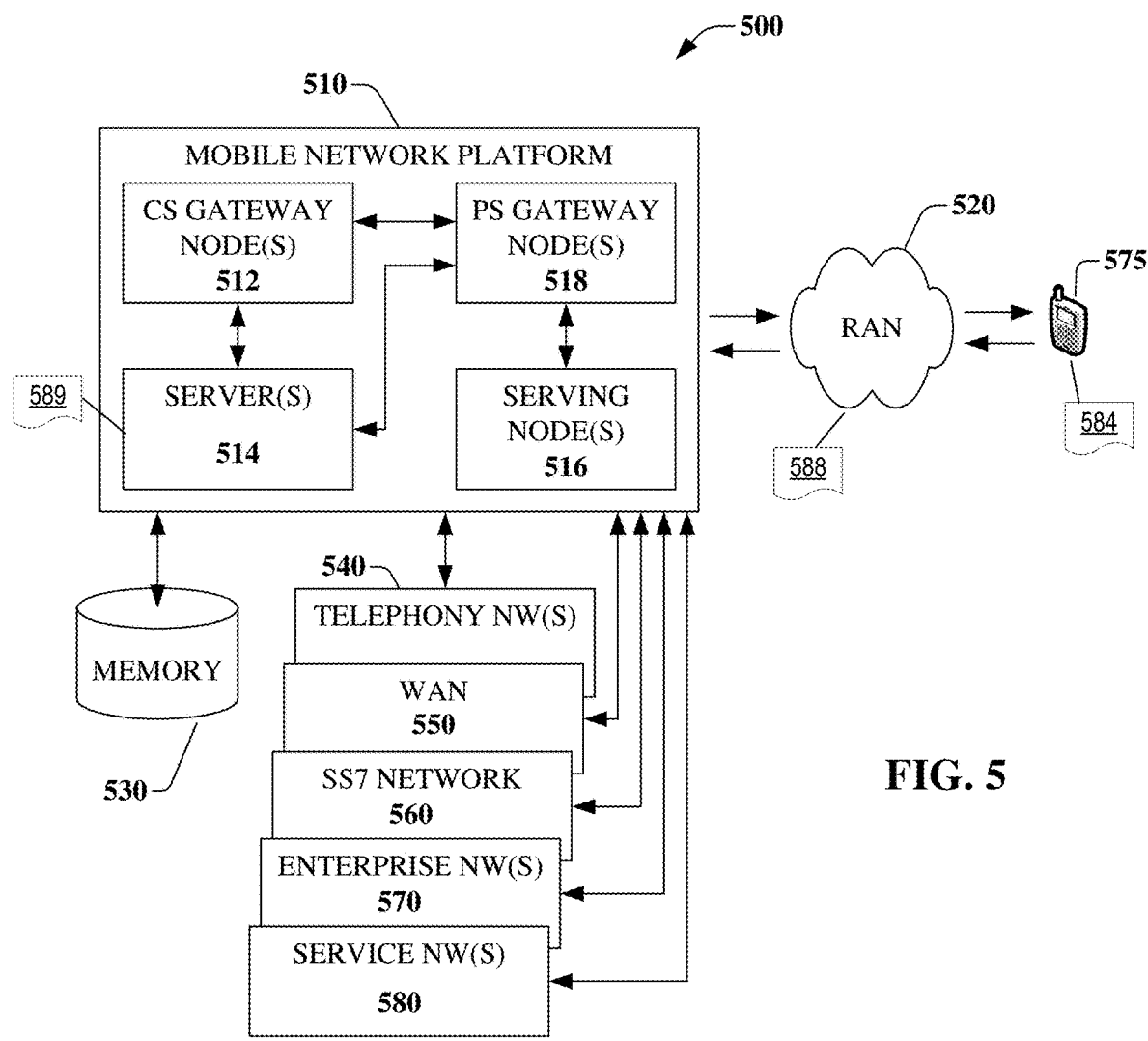
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving user data that labels one or more objects within a training image as a category of interest and applying the user data and the training image to a CNN to obtain a trained result. The trained result may identify other machine-recognized features within the training image according to the category of interest. The trained result may be presented at a display device, allowing the user to evaluate accuracy of the machine-recognized features. User-initiated feedback, e.g., identifying positive results (i.e., successful categorizations) and/or negative results (i.e., mis-categorizations) may be provided to the CNN, which is adapted to re-evaluate the same image and/or a different image according to the user-initiated feedback. The process may be repeated for multiple iterations, e.g., until a suitable performance is achieved, after which the suitably trained CNN may be applied to other novel images. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

When used in AI-based, semi-supervised interactive map enrichment for RAN planning, the embodiment 500 of the mobile network platform 510 may include one or more of functionality 589 at the server(s) 514, functionality 588 operational within the RAN 520 and/or functionality 584 operational within the mobile device 575. One or more of the disclosed functionalities 584, 588, 589 can be adapted to perform one or more of the techniques disclosed herein, such as functionality of one or more of the RAN planning server 180, 380, the CNN processor 182, 382, and user equipment adapted to present maps and/or images and to obtain user input in a form of labeling and/or feedback to machine-generated categorizations, according to the various techniques disclosed herein.

Figure 6:
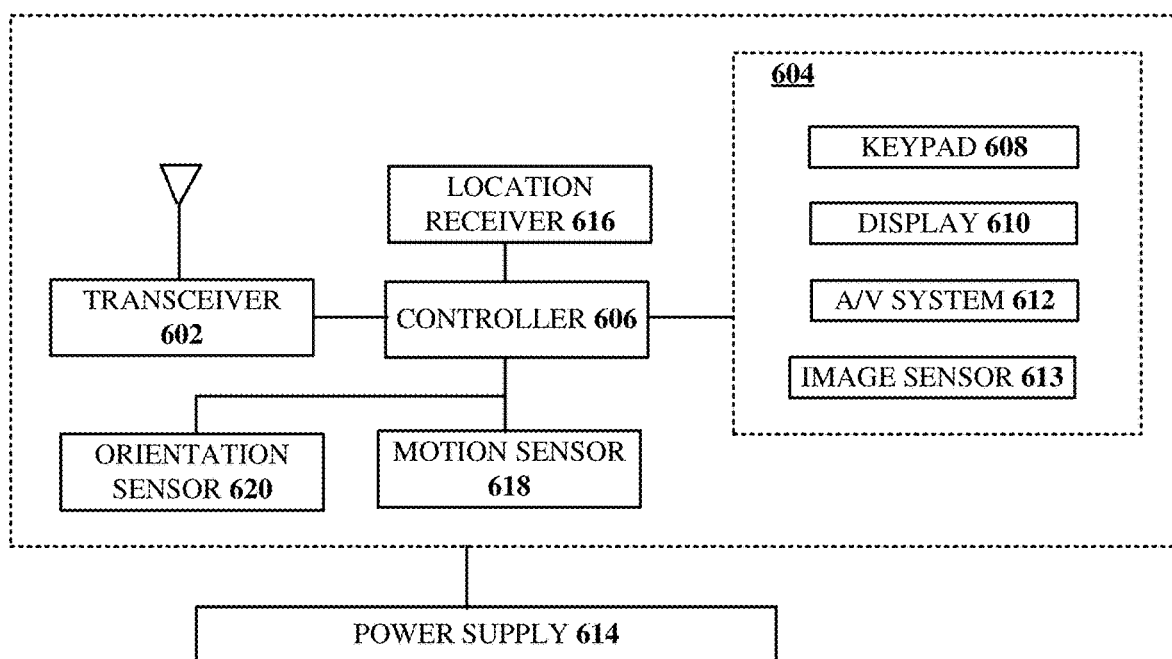
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving user data that labels one or more objects within a training image as a category of interest and applying the user data and the training image to a CNN to obtain a trained result. The trained result may identify other machine-recognized features within the training image according to the category of interest. The trained result may be presented at a display device, allowing the user to evaluate accuracy of the machine-recognized features. User-initiated feedback, e.g., identifying positive results (i.e., successful categorizations) and/or negative results (i.e., mis-categorizations) may be provided to the CNN, which is adapted to re-evaluate the same image and/or a different image according to the user-initiated feedback. The process may be repeated for multiple iterations, e.g., until a suitable performance is achieved, after which the suitably trained CNN may be applied to other novel images.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Map enrichment may be useful for any application that builds maps or requires accurate and updated maps. In an example context of network planning, map enrichment may be supported by applying the iterative, user-assisted machine-learning techniques disclosed herein to identify of potential locations for antennas, like poles, towers, high buildings, etc. Alternatively or in addition, the same techniques may be applied to aid in discovery of obstructions to wireless transmissions like vegetation, buildings, features of the terrain. Likewise, the techniques may be applied to detection of other features that may assist network planners in achieving a better understanding of the environment, such as available access roads, power infrastructure, types of buildings, e.g., residential vs. commercial, antennas of competitors, etc.

It is understood that interactive and dynamic map enrichment may be applied to other applications, without limitation, including real-time images, to detect temporary features of the environment such as traffic conditions, gathering of people in a particular place, vehicles of a certain type in a specific area, etc. Beneficially, such image analysis may be accomplished dynamically and flexibly in comparison to standard rigid processes of training a model and verifying it based on data that were labeled independently, with no ability to interact and re-label results.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method for annotating a map, comprising:
    training, by a processing system including a processor, a neural network according to a training image and a user-identified, wireless network entity portrayed within the training image to obtain a first trained result that identifies a machine-recognized entity of the training image, the training further comprising:
        subdividing, by the processing system, the training image into a plurality of non-overlapping image subregions of the training image;
        sending, by the processing system, the training image and the first trained result to user equipment for display at a display device, resulting in a displayed training result;
        receiving, by the processing system and from the user equipment, first user feedback responsive to the displayed training result, wherein the first user feedback comprises a selection of a first subregion of the plurality of non-overlapping image subregions of the training image to obtain a first identified image subregion; and
        determining, by the processing system, a training score responsive to the first user feedback; and
    annotating, by the processing system, a map according to the machine-recognized entity to obtain an annotated map responsive to the training score exceeding a training threshold.

2. The method of claim 1, wherein the user-identified, wireless network entity comprises an antenna mount, and wherein the first identified image subregion comprises the antenna mount.

3. The method of claim 2, wherein the plurality of non-overlapping image subregions is determined according to a predetermined segmentation.

4. The method of claim 3, wherein the plurality of non-overlapping image subregions comprises at least one of different sized subregions or different shaped subregions according to the predetermined segmentation, and wherein the antenna mount comprises at least one of a tower, a utility pole, or a building.

5. The method of claim 1, wherein the user-identified, wireless network entity comprises a structural feature adapted for mounting a wireless network antenna.

6. The method of claim 1, wherein the determining of the training score further comprises determining a first contributing portion according to a number of machine-recognized entities correctly identified of a number of entities observable within the training image.

7. The method of claim 1, further comprising:
    receiving, by the processing system and from the user equipment, second user feedback responsive to the displayed training result, wherein the second user feedback comprises a selection of a second subregion of the plurality of non-overlapping image subregions of the training image to obtain a second identified image subregion comprising a machine-recognized entity incorrectly identified within the training image, wherein the determining of the training score further comprises determining a second contributing portion according to the second identified image subregion.

8. The method of claim 7, wherein the determining of the training score further comprises determining a third contributing portion according to a number of machine-recognized entities correctly identified of a number of entities observable within the training image.

9. The method of claim 1, further comprising:
    responsive to the training score exceeding the training threshold:
        storing, by the processing system, the neural network to obtain a stored neural network;
        receiving a test image; and applying, by the processing system the stored neural network to the test image to obtain a test result.

10. The method of claim 1, wherein the user-identified, wireless-network entity comprises a feature for mounting a wireless network antenna, a feature adapted for impeding operation of a wireless network antenna, or both.

11. A non-transitory, machine-readable medium comprising executable instructions that, when executed by a processing system including a processor, facilitate performance of operations, the operations comprising:
   training a neural network according to a training image and a user-identified feature portrayed within the training image to obtain a first trained result image that identifies a machine-recognized feature of the training image, the training further comprising:
      subdividing the first trained result image into a plurality of non-overlapping image subregions of the first trained result image;
      providing the training image and the first trained result image for display at a display device, resulting in a displayed training result, wherein the displayed training result comprises borders of the plurality of non-overlapping image subregions;
      obtaining, from user equipment, first user feedback responsive to the displayed training result, wherein the first user feedback comprises a first selection of a subregion of the plurality of non-overlapping image subregions of the first trained result image to obtain a first identified image subregion; and
      determining a training result responsive to the first user feedback; and
   annotating a map according to the machine-recognized feature to obtain an annotated map responsive to the training result exceeding a threshold.

12. The non-transitory, machine-readable medium of claim 11, wherein the plurality of non-overlapping image subregions comprises at least one of different sized subregions or different shaped subregions.

13. The non-transitory, machine-readable medium of claim 12, wherein the plurality of non-overlapping image subregions are determined according to a predetermined segmentation.

14. The non-transitory, machine-readable medium of claim 11, wherein the operations further comprise:
   receiving, from the user equipment, second user feedback responsive to the displayed training result, wherein the second user feedback comprises a selection of a second subregion of the plurality of non-overlapping image subregions of the training image to obtain a second identified image subregion comprising a machine-recognized entity incorrectly identified within the training image, wherein the determining of the training result further comprises determining a second contributing portion according to the second identified image subregion.

15. The non-transitory, machine-readable medium of claim 11, wherein the user-identified feature comprises a feature for mounting a wireless network antenna, a feature for impeding operation of a wireless network antenna, or both.

16. A device, comprising:
   a processing system including a processor; and
   a memory that stores executable instructions that, when executed by the processing system, facilitate performance of operations, the operations comprising:
      providing a training image and a user-identified feature to a neural network adapted to train itself according to the training image and the user-identified features to obtain a first trained result that identifies a machine-recognized feature of the training image;
      providing the training image and the first trained result for display at a display device, resulting in a training result image;
      subdividing the training result image into a plurality of non-overlapping image subregions of the training result image;
      obtaining, from user equipment, first user feedback responsive to the displayed training result, wherein the first user feedback comprises a first selection of a subregion of the plurality of non-overlapping image subregions of the training result image to obtain a first identified image subregion;
      determining a training result responsive to the first user feedback; and
      annotating a map according to the machine-recognized feature to obtain an annotated map responsive to the training result satisfying a training requirement.

17. The device of claim 16, wherein the plurality of non-overlapping image subregions comprises at least one of different sized subregions or different shaped subregions.

18. The device of claim 17, wherein the plurality of non-overlapping image subregions is determined according to a predetermined segmentation.

19. The device of claim 17, wherein the operations further comprise: receiving, from the user equipment, second user feedback responsive to the displayed training result, wherein the second user feedback comprises a selection of a second subregion of the plurality of non-overlapping image subregions of the training image to obtain a second identified image subregion comprising a machine-recognized entity incorrectly identified within the training image, wherein the determining of the training result further comprises determining a second contributing portion according to the second identified image subregion.

20. The device of claim 16, wherein the user-identified feature comprises a feature for mounting a wireless network antenna, a feature for impeding operation of a wireless network antenna, or both.

* * * * *